US005540397A

United States Patent [19]
Yoshikawa

[11] Patent Number: 5,540,397
[45] Date of Patent: Jul. 30, 1996

[54] SPINNING REEL

[75] Inventor: Osamu Yoshikawa, Sakai, Japan

[73] Assignee: Shimano Inc., Sakai, Japan

[21] Appl. No.: 365,165

[22] Filed: Dec. 28, 1994

Related U.S. Application Data

[63] Continuation of Ser. No. 25,763, Mar. 3, 1993, abandoned.

[30] Foreign Application Priority Data

Mar. 6, 1992 [JP] Japan ................................. 4011302 U

[51] Int. Cl.$^6$ ..................................................... A01K 89/01
[52] U.S. Cl. .......................... 242/311; 242/283; 242/314
[58] Field of Search .................................. 242/311, 312, 242/314, 315, 242, 241

[56] References Cited

U.S. PATENT DOCUMENTS

| | | | |
|---|---|---|---|
| 2,903,201 | 9/1959 | Sarah | 242/311 |
| 3,114,514 | 12/1963 | Clark | 242/242 |
| 3,223,347 | 12/1965 | Clark | 242/311 |
| 3,224,703 | 12/1965 | Clark | 242/242 |
| 3,296,731 | 1/1967 | Wood | 242/311 |
| 3,381,914 | 5/1968 | Taggart | 242/311 |
| 4,130,251 | 12/1978 | Findley | 242/311 |
| 4,359,196 | 11/1982 | Puryear | 242/311 |
| 4,747,560 | 5/1988 | Karlsson | 242/279 |
| 5,120,002 | 6/1992 | Kawai | 242/314 |
| 5,137,227 | 8/1992 | Allis et al. | 242/312 |

FOREIGN PATENT DOCUMENTS 1-127465  8/1989  Japan .

Primary Examiner—Katherine Matecki
Attorney, Agent, or Firm—Dickstein, Shapiro & Morin, L.L.P.

[57] ABSTRACT

A spinning reel has a detachable cover for closing a side of a reel body. The reel body includes engaging pieces, while the cover includes engageable elements.

The cover is movable between a first position for tight contact with the reel body to close an interior of the reel body, and a second position rotated a predetermined angle from the first position about a lateral axis of the reel body. The engaging pieces are engaged with the engageable elements when the cover is in the first position, to realize the cramping of the cover with the reel body, to assure the closed condition of the reel body, and disengaged from the engageable elements when the cover is in said second position, to allow the cover to separate from the reel body. And the reel have a locking system to maintain the cover in the first position.

3 Claims, 5 Drawing Sheets

SPINNING REEL

This application is a continuation of application Ser. No. 08/025,763 filed Mar. 3, 1993, now abandoned.

BACKGROUND OF THE INVENTION

1. Field of the Invention

The present invention relates to an improvement in a spinning reel having an openable cover forming a lateral portion of a reel body.

2. Description of the Related Art

A known spinning reel constructed as above is disclosed in Japanese Utility Model Publication Kokai No. 1-127465, for example. This reel has an openable cover forming a lateral portion of a reel body, and a handle shaft supported by the cover and a side wall of the reel body opposed to the cover. The cover is fixable to the reel body with a plurality of screws, and is opened and closed through movement of the cover axially of the handle shaft.

The known spinning reel has the advantage that, since the cover is fixable with a plurality of screws, a gap between the reel body and cover is eliminated, even if the cover is relatively large, by using many screws. However, not only is a tool such as a screwdriver needed to loosen each screw, but the screwdriver must be used until all of the screws are completely removed to allow opening of the cover. Conversely, when closing the cover, the screwdriver must be used repeatedly until all of the screws are tightened. Thus, there is room for improvement with regard to the time and trouble taken to open and close the cover.

It is conceivable to reduce the number of screws by providing a cover openable and closable on hinges or a cover openable and closable by sliding relative to the reel body. However, in the type of spinning reel to which the present invention is directed, the cover acts also as a support for the handle shaft, and the presence of a bearing on the cover makes it difficult to realize a structure for opening and closing the cover.

SUMMARY OF THE INVENTION

An object of the present invention is to provide an improved spinning reel having a cover openable and closable without a troublesome operation and without requiring a special modification to be made of the bearing for supporting a handle shaft.

The above object is fulfilled, according to the present invention, by a spinning reel having a cover attached to a reel body to be rotatable about a lateral axis of the reel body, and a coupling device between the cover and reel body, wherein the cover is rotatable about the lateral axis between a position to be fitted to the reel body for closing the interior thereof, and a position separable from the reel body.

In a preferred embodiment of the invention, a coupling device reaches a separable state by rotating an entire cover about the axis of a handle shaft. In this state, the cover may be detached from the reel body by moving the cover along the axis of the handle shaft. For attaching the cover to the reel body, the cover is moved along the axis of the handle shaft into contact with the reel body, and is thereafter rotated in the opposite direction. As a result, the coupling device becomes connected to couple the cover and reel body.

Since the coupling device is formed between the cover and reel body in this invention, it is no longer necessary for the manufacturers to use many screws or form screw receiving bores in a manufacturing process as practiced in the prior art. On the part of the user, the necessity to manipulate such screws is eliminated. Moreover, the bearing provided on the cover for supporting the handle shaft may remain the same as in the prior art.

Thus, the present invention provides an improved spinning reel having a cover openable and closable without a troublesome operation and without requiring a special modification to be made of the bearing for supporting a handle shaft.

Particularly where the coupling device includes a plurality of engaging pieces and engageable elements, the cover may be attached or detached in a one-touch operation with a reduced amount of rotation required therefor. The invention provides a further advantage that, since the cover is rotatable relative to the reel body about the axis of the handle shaft, the bearing is readily aligned with high precision for supporting the handle shaft, to allow a handle operation to be carried out with increased smoothness.

Other objects and features of this invention will be understood from the following description taken with reference to the accompanying drawings.

DETAILED DESCRIPTION OF THE PREFERRED EMBODIMENTS

Figure 1:
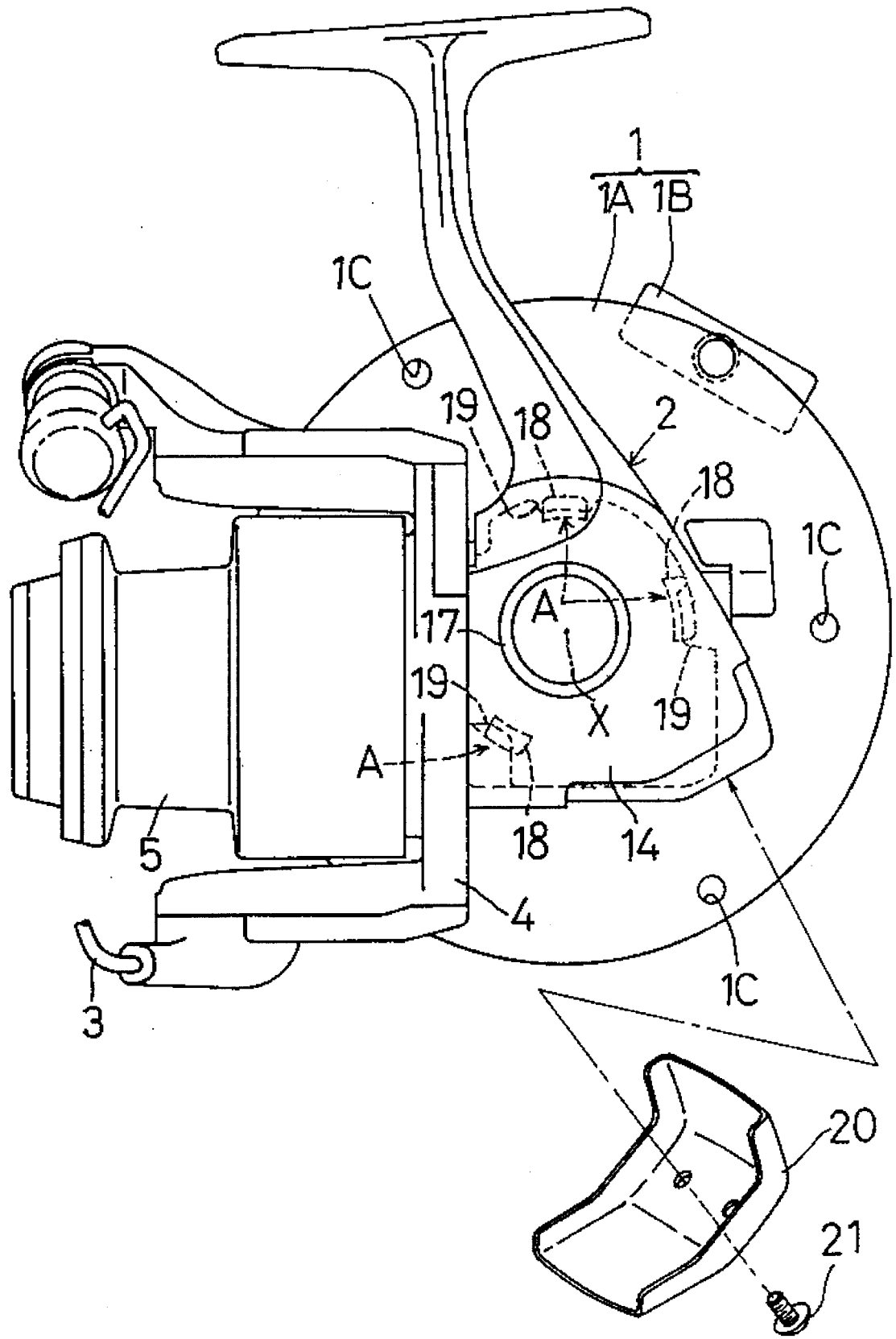
FIG. 1 is a side view of a spinning reel with a cover opened according to the present invention.
Figure 2:
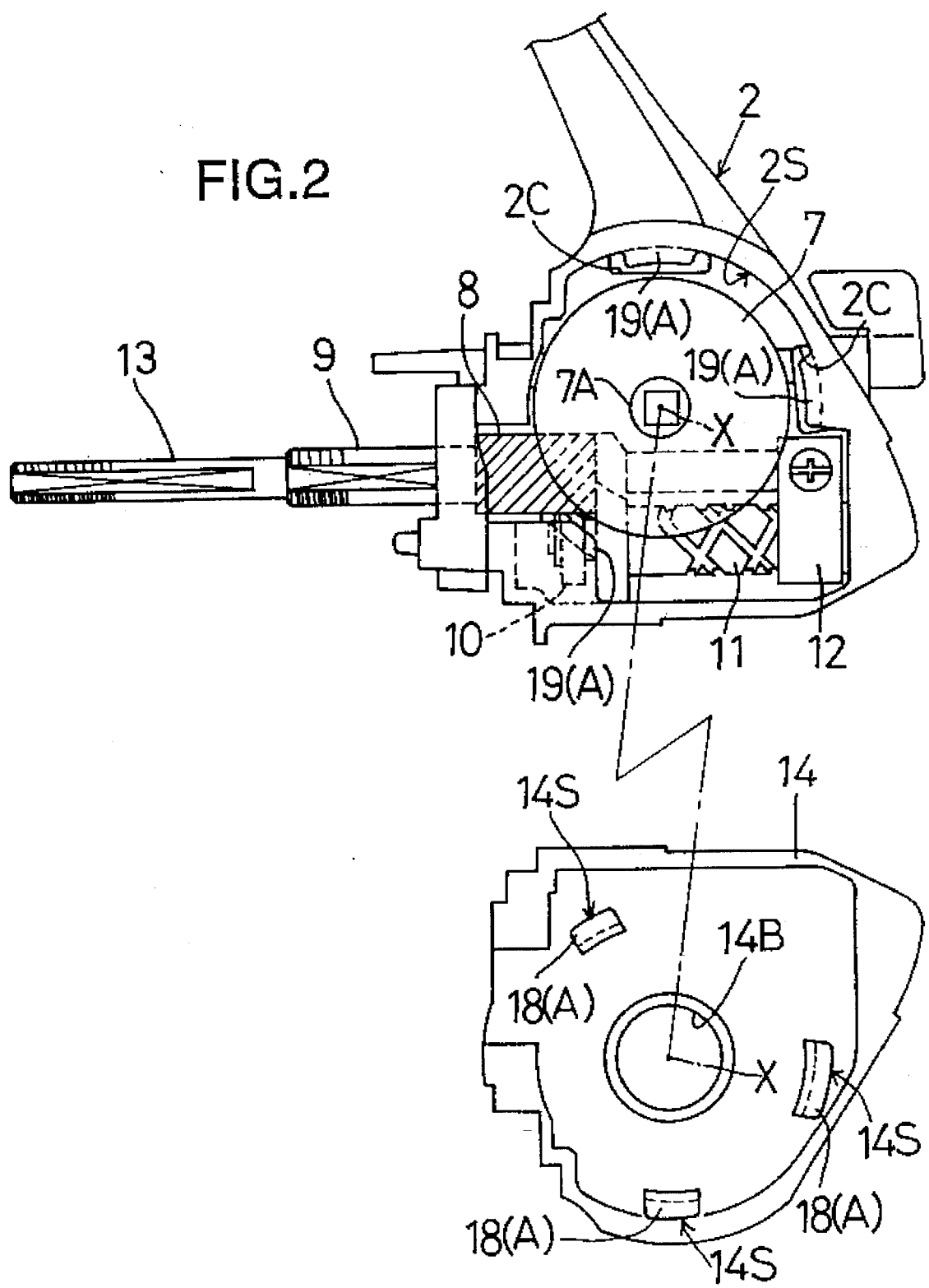
FIG. 2 is a side view showing how the cover is opened and closed.

FIGS. 1 and 2 show a spinning reel according to the present invention. This spinning reel includes a handle 1 attached to a reel body 2, a rotor 4 carrying a bail 3 and mounted on a forward portion of the reel body 2, and a spool 5 connected to the forward portion of the reel body 2. The spinning reel further includes a drive system for transmitting drive from a drive gear 7 rotatable with a handle shaft 6 to the rotor 4 through a pinion gear 8 and a sleeve shaft 9, and another drive system for transmitting drive from the pinion gear 8 to a spool shaft 13 through an oscillating mechanism including an input gear 10, a screw shaft 11 and a slider 12 for converting the drive into a reciprocal motion.

Figure 3:
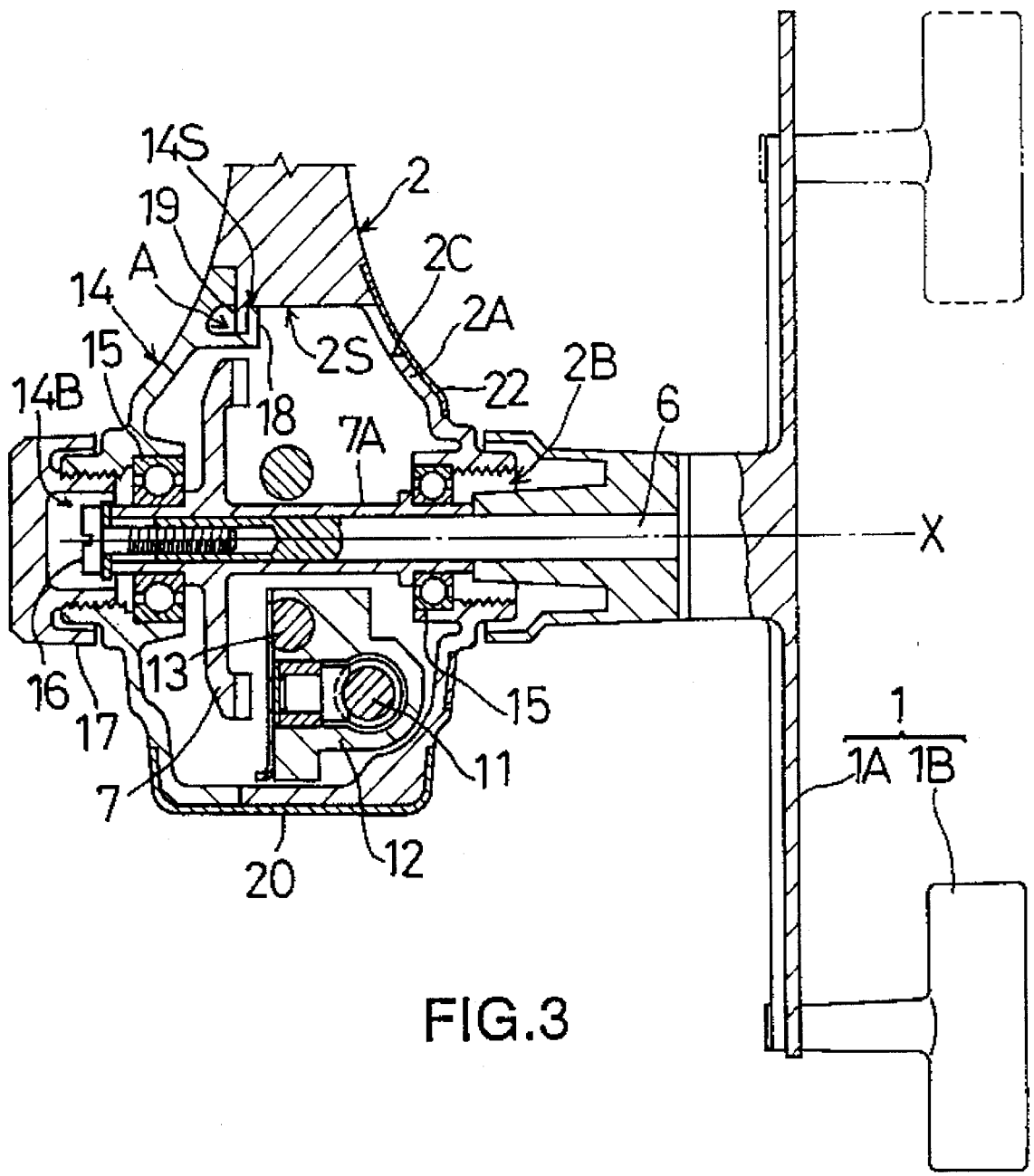
FIG. 3 is a rear view in vertical section of a reel body to which a handle and a handle shaft are attached.

As best shown in FIG. 3, the reel has a cover 14 attached laterally of the reel body 2. The cover 14 is openable and closable by moving along an axis X of the handle shaft 6. The cover 14 and a side wall 2A of the reel body 2 opposed to the cover 14 have bearings 15 for supporting shaft portions 7A of the drive gear 7 containing the handle shaft 6. The cover 14 and the reel body 2 define inner contact surfaces 14S and 2S, respectively, for contacting each other and supporting the cover 14 to be rotatable about the axis X of the handle shaft 6. A coupling mechanism A is provided between the cover 14 and reel body 2 so that the cover 14 is rotatable to be attached to and detached from the reel body 2.

As shown in FIGS. 1 and 3, the handle 1 includes a disk-shaped member 1A and a grip 1B attached thereto. The disk-shaped member 1A defines a plurality of mounting bores 1C for allowing the grip 1B to be attached to different positions to provide varied revolving arm lengths. The handle shaft 6 is rotatable with the shaft portions 7A of the drive gear 7. The handle shaft 6 may be inserted into the reel body 2 from the right side or left side, whichever the user chooses. A screw 16 is meshed into an end of the handle shaft 6 remote from the handle 1 to fix the handle shaft 6 to the shaft portions 7A of the drive gear 7. The cover 14 defines a handle shaft inserting opening 14B, while the side wall 2A of the reel body 2 defines a handle shaft inserting opening 2B. The opening 14B remote from the handle 1 is closed by a lid 17 screwed thereto.

Figure 4:
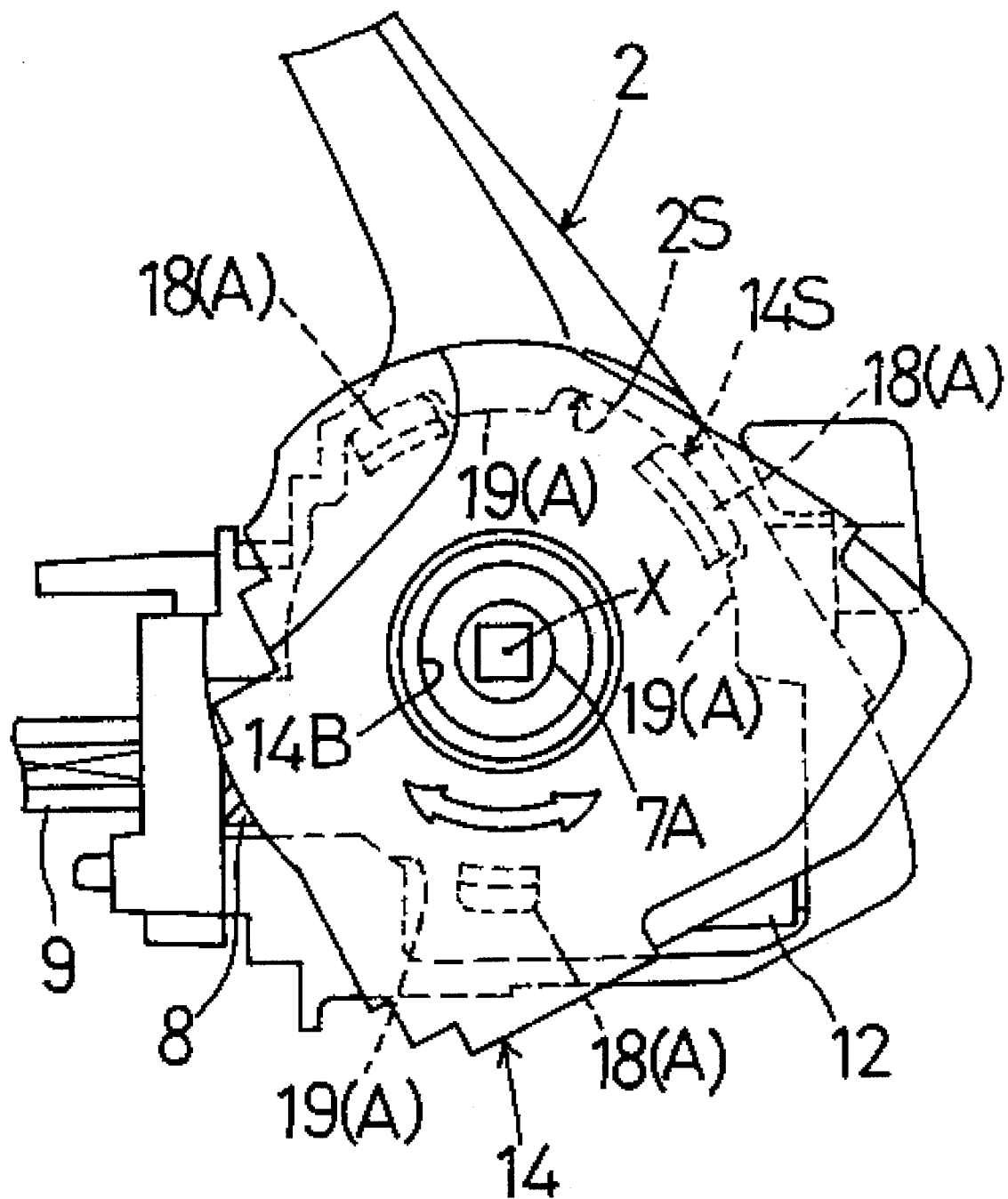
FIG. 4 is a side view of the reel body to which the handle and handle shaft are attached.

As best shown in FIG. 4, the coupling mechanism A includes a plurality of engaging pieces 18 formed on the cover 14, and a plurality of engageable elements 19 formed on the reel body 2 for engaging with and disengaging from the engaging pieces 18. With this coupling mechanism A, the cover 14 is securely coupled to the reel body 2 by rotating the cover 14 a predetermined amount (e.g. through a relatively small angle of about 30 degrees). By rotating the cover 14 the same amount in the opposite direction, the cover 14 is allowed to detach along the axis X. A metallic or plastic protector 20 is fixed with screws 21 to a rear position of the reel body 2. The protector 20 acts also as a lock element for engaging the cover 14 and reel body 2 to prevent relative rotation therebetween.

Though not illustrated clearly, the engaging pieces 18 have inclined contact surfaces for contacting the engageable elements 19. With the inclined contact surfaces, the cover 14 is drawn to the reel body 2 as the cover 14 is rotated in the coupling direction. Consequently, the cover 14 may be coupled to the reel body 2 in an improved sealing condition.

The reel body 2 is formed by using dies (not shown). Openings 2C must be formed in the side wall 2A of the reel body 2 for moving dies into and out of the reel body 2 in order to form the engageable elements 19 integrally with the reel body 2. As shown in FIG. 3, a name plate 22 is applied to an outer surface of the side wall 2A to close the openings 2C.

For uncoupling the cover 14, the rotor 4 is removed, the protector 20 is removed after turning the screws 21, and the entire cover 14 is rotated. Consequently, as shown in FIG. 4, the engaging pieces 18 are disengaged from the engageable elements 19. The cover 14 may now be opened by moving it along the axis X of the handle shaft 6. For coupling the cover 14, the cover 14 is placed in contact with the reel body 2, and rotated in the opposite direction. As a result, the engaging pieces 18 are coupled to the engageable elements 19. Subsequently, the protector 20 is fixed in place to complete the cover closing operation.

Figure 5:
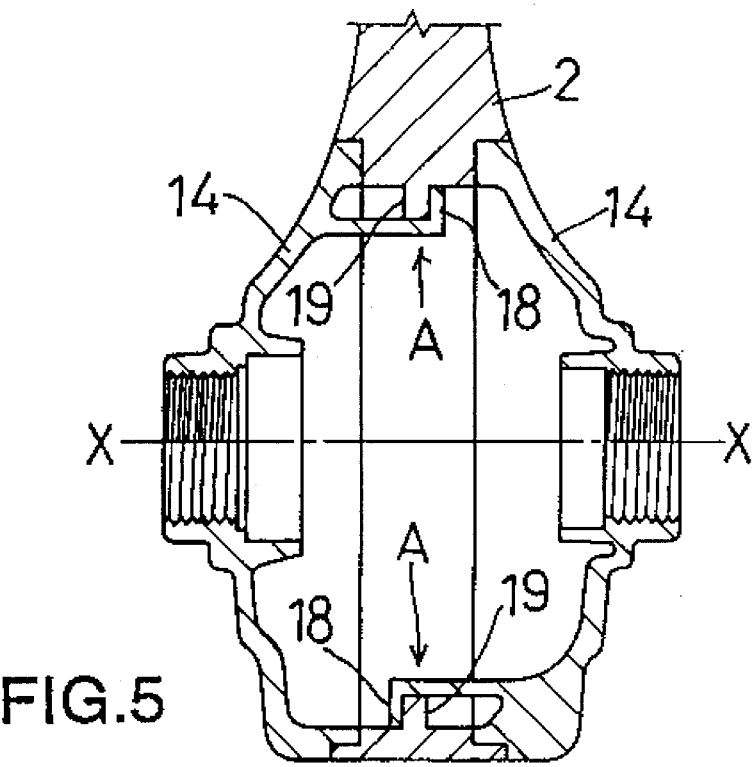
FIG. 5 is a rear view in vertical section of a reel body in a different embodiment of the invention.
Figure 6:
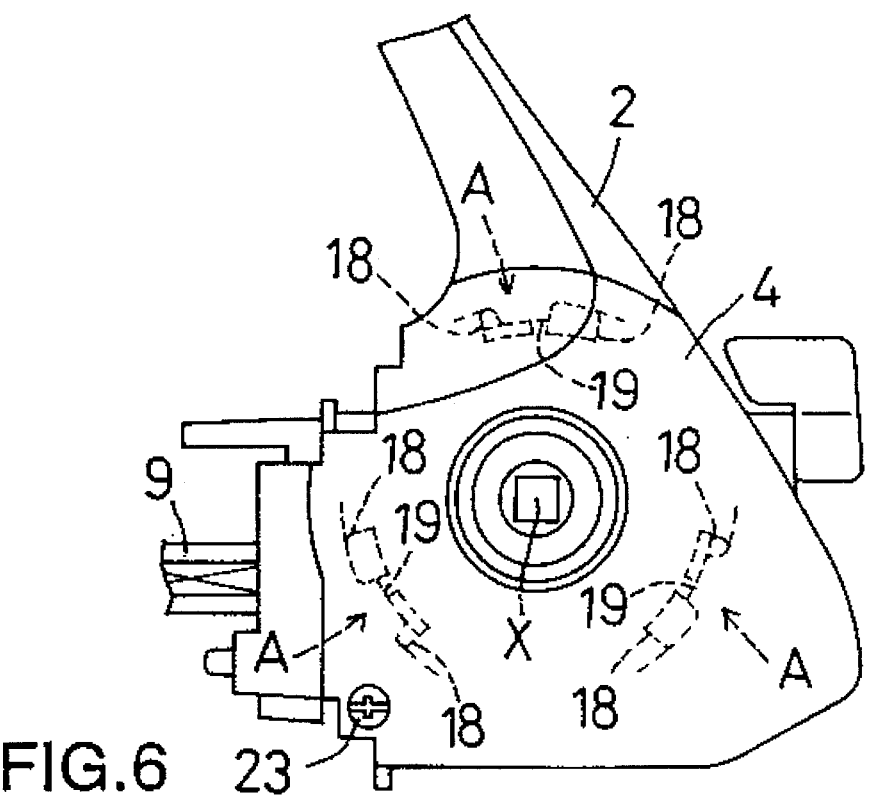
FIG. 6 is a side view of the reel body shown in FIG. 5.

A different embodiment of the invention will be described next. As shown in FIGS. 5 and 6, a pair of covers 14 may be attached to right and left sides of the reel body 2. Each cover 14 may be openable and closable by a coupling mechanism A as in the preceding embodiment.

In this embodiment, the engageable elements 19 to engage with the two covers 14 are arranged not to overlap one another as seen in a direction along the axis X of the handle shaft 6. Screws for locking the covers 14 to closed positions extend through the covers 14 to be meshed into the reel body 2.

In a further embodiment of the invention, a lock mechanism may be provided to maintain the cover closed through the coupling mechanism including the engaging pieces and engageable elements as described hereinbefore. The lock mechanism may include a spring or the like to impart a biasing force to prevent relative rotation between the cover and reel body, and a pin or the like which may be pushed to allow the relative rotation. The cover may be the click type in which balls or the like engage engageable portions of the cover when the cover reaches a closed position, or may be the detent-type. The coupling mechanism may be in the form of screws formed on the mutual contact surfaces of the cover and reel body. In this case, the cover may be attached or detached only with a rotation through at least 360 degrees.

In another different embodiment of the invention, a fixing operation to fix the handle shaft to prevent the handle shaft from being removed off can serve as a method to lock the cover to the reel body as well.

As a still further embodiment of the invention, the cover may have a modified structure or shape to be attachable and detachable with the rotor remaining in place.

What is claimed is:

1. A spinning reel comprising:

a reel body having a handle shaft inserted laterally thereof, said reel body having an open side and engaging means;

a detachable cover for closing said open side of said reel body, said cover including engageable means, said cover being movable between a first position to close an interior of said reel body by fitting on said open side of said reel body, and a second position rotated from said first position about a lateral axis of said reel body; and said engaging means being engaged with said engageable means when said cover is in said first position, to prohibit said cover from displacing laterally relative to said reel body, and disengaged from said engageable means when said cover is in said second position, to allow said cover to separate laterally from said reel body;

locking means to maintain said cover in said first position relative to said reel body;

said reel body and said cover each having a rear portion and wherein said locking means comprises a platelike member substantially tightly fitted onto said rear portions of said reel body and said cover in a manner to be extended over said reel body of said cover, and a screw to fix said platelike member at least to said reel body.

2. A spinning reel comprising:

a spinning reel body having a handle shaft inserted laterally thereof, said handle shaft having a rotational axis, said reel body having an open side and engaging means;

a detachable cover for closing said open side of said reel body, said cover including engageable means, said cover being rotatable about said rotational axis of said handle shaft from a first position to a second position, said cover when in said first position closing an interior of said reel body by fitting on said open side of said reel body; and locking means to maintain said cover in said first position relative to said reel body;

said engaging means being engaged with said engageable means when said cover is in said first position, to prohibit said cover from displacing laterally relative to said reel body, and disengaged from said engageable means when said cover is in said second position, to allow said cover to separate laterally from said reel body to open said reel body; and wherein said reel body and said cover each have a rear portion and wherein said locking means comprises a platelike member substantially tightly fitted onto said rear portions of said reel body and said cover in a manner to be extended over said reel body and said cover, and a screw to fix said platelike member at least to said reel body.

3. A spinning reel comprising:

a spinning reel body having a handle shaft inserted laterally thereof, said handle shaft having a rotational axis, said reel body having an open side and engaging means;

a rotor rotatably supported on said reel body;

a spool shaft reciprocatively supported on said reel body;

a first drive system for transmitting drive force from said handle shaft to said rotor, said first drive system including:
 a drive gear rotatable with said handle shaft; and
 a pinion gear engaged with said drive gear;

a second drive system for transmitting drive force from said pinion gear to said spool shaft, said second drive system including an oscillating mechanism for converting a rotational movement of said pinion gear to a reciprocating movement;

a detachable cover for closing said open side of said reel body, said cover including engageable means, said cover being rotatable about said rotational axis of said handle shaft from a first position to a second position, said cover when in said first position closing said open side of said reel body; and locking means to maintain said cover in said first position relative to said reel body;

said engaging means being engaged with said engageable means to prohibit said cover from displacing laterally relative to said reel body when said cover is in said first position, and disengaged from said engageable means when said cover is in said second position, to allow said cover to separate laterally from said reel body;

wherein said drive gear, said pinion gear, and said oscillating mechanism are accessible from said open side of said reel body when said cover is separated from said reel body; and wherein said reel body and said cover each have a rear portion and wherein said locking means comprises a platelike member substantially tightly fitted onto said rear portions of said reel body and said cover in a manner to be extended over said reel body and said cover, and a screw to fix said platelike member at least to said reel body.

* * * * *